UNITED STATES PATENT OFFICE.

EDWARD RICHARDS BOLTON AND ERNEST JOSEPH LUSH, OF LONDON, ENGLAND, ASSIGNORS TO TECHNICAL RESEARCH WORKS LIMITED, OF LONDON, ENGLAND.

NEUTRALIZATION OF OILS AND FATS.

1,419,109.   Specification of Letters Patent.   Patented June 6, 1922.

No Drawing.   Application filed February 21, 1921. Serial No. 446,867.

*To all whom it may concern:*

Be it known that we, EDWARD RICHARDS BOLTON and ERNEST JOSEPH LUSH, subjects of the King of Great Britain and Ireland, residing at London, England, have invented new and useful Improvements in the Neutralization of Oils and Fats (for which we have filed an application in Great Britain, No. 29,705, dated Nov. 28, 1919), of which the following is a specification.

The combination of glycerine with fatty acids has been proposed and methods of neutralizing fatty acids present in fats and oils by combination in situ with glycerine have also been proposed. In carrying out the above process it has been found necessary to subject the reacting substances namely glycerine and fatty acids or oils or fats containing free fatty acids to violent agitation over long periods since in the presence of excess of glycerine the above mentioned process does not yield the required product viz: triglycerides such as occur in natural oils but results in mixtures of mono- and di-glycerides of the fatty acids therewith.

We have discovered a process whereby the above difficulties may be overcome and a neutralized oil free from mono- or di-glycerides may be produced in a comparatively short period of time and under conditions which enable such process to proceed conjointly with other known processes of treating oils, such as deodorization by treatment with superheated steam or with superheated steam under vacuum. The process consists essentially in neutralizing oils or fats containing free fatty acids by subjecting them in a reaction vessel, to the action of a quantity of mono-glycerides or a mixture of mono- and di-glycerides of the fatty acids separately prepared and chemically equivalent to the free fatty acids to be neutralized.

In our process importance is attached to the rapid and complete removal of the water chemically formed during the neutralization of the fatty acids. This is readily accomplished by the heating in vacuo or a current of neutral gas, and takes place without loss of glycerine from the reaction vessel such as would occur in the use of glycerine by itself.

By our process a rancid oil is sweetened even before the free fatty acids are completely neutralized and a product suitable for an edible base is produced from an oil otherwise undesirable.

As an example of working the above described process:—one cwt. of cocoanut oil having 10.2% free fatty acids is placed in an aluminium vessel (the vessel being fitted with a closed steam heating coil) to which is added 6¼ lbs. of mono-glyceride prepared from cocoanut fatty acids. This mixture is heated to a temperature of 250° C. by the means provided and maintained at this temperature for about three hours, the air in the vessel being displaced by a current of carbon di-oxide during the reaction.

After the above treatment the free fatty acids in the oil in the reaction vessel will be found to have been reduced to about 2% and the resultant oil so treated is then suitable for use in neutralizing and (or) refining process in the ordinary manner being free from mono- or di-glycerides.

The production of mono-glycerides or mono- and di-glycerides suitable for carrying out the aforesaid neutralization process can, by preference, and with considerable saving of time, be obtained by the process described in the specification of our application, Serial No. 446,866, filed February 21, 1921.

What we claim is:—

1. The process of simultaneously neutralizing and deodorizing oils or fats, etc., containing free fatty acids by subjecting them in a reaction vessel, to the action of a quantity of mono-glycerides of the fatty acids separately prepared and chemically equivalent to the free fatty acids to be neutralized while heating the treated material in the reaction vessel in vacuo.

2. The process of simultaneously neutralizing and deodorizing oils or fats, etc., containing free fatty acids by subjecting them in a reaction vessel to the action of a mixture of mono- and di-glycerides of the fatty acids separately prepared and chemically equivalent to the free fatty acids to be neutralized while heating the treated material in the reaction vessel in vacuo.

In witness whereof we affix our signatures.

EDWARD RICHARDS BOLTON.
ERNEST JOSEPH LUSH.